June 12, 1962 S. LEVINE 3,039,039
SYNCHRONOUS MOTOR SYSTEMS
Filed Oct. 27, 1959

INVENTOR
STANLEY LEVINE
BY John J. Rogan
ATTORNEY

United States Patent Office 3,039,039
Patented June 12, 1962

3,039,039
SYNCHRONOUS MOTOR SYSTEMS
Stanley Levine, Bronx, N.Y., assignor, by mesne assignments, to Litton Systems, Inc., Beverly Hills, Calif., a corporation of Maryland
Filed Oct. 27, 1959, Ser. No. 849,030
12 Claims. (Cl. 318—492)

This invention relates to synchronous motor systems and more particularly it relates to systems for the efficient operation and stabilization of synchronous motors of the variable reluctance kind, of which the so-called La Cour or phonic-wheel motor is typical.

An object of the invention is to provide a novel circuit arrangement for such synchronous motors so as to correlate the pulse characteristics of the input driving pulses with the incremental synchronous rotation of the motor rotor.

Another object is to provide a novel drive and stabilizing circuit for a synchronous motor of variable reluctance kind, employing an energy dissipation arrangement connected to the magnetizing windings of the motor for dissipating the energy in the said windings in correlated timed relation with the duration of the electric input driving pulses applied to the motor.

A feature of the invention relates to a novel synchronous motor system employing a variable reluctance motor and wherein special energy dissipating means are provided for the motor stator windings to insure that at the end of each input driving pulse the magnetic field between the stator windings and the associated rotor decays at a rate which is accurately correlated with the desired running characteristics of the motor, and thereby to increase power, as well as the well known "pull-in" effect, at synchronous speed.

Another feature relates to the novel combination of a variable reluctance synchronous motor and an energy damping arrangement whereby there are obtained a substantial reduction in motor noise and motor core losses while achieving increased motor efficiency.

A still further feature relates to the novel organization, arrangement and relative location, interconnection and proportioning of parts which cooperate to provide an improved synchronous drive system.

Other features and advantages not specifically enumerated will become apparent after a consideration of the following detailed descriptions, the appended claims and the attached drawing.

While the invention will be described in connection with one particular well known construction of synchronous motor, it will be understood that in its various aspects, the invention is equally well applicable to a wide variety of alternating-current or pulse-type, of which the La Cour or phonic-wheel motor is typical. Accordingly, in the drawing, FIG. 1 is a cross sectional view of a typical synchronous motor of a variable reluctance two-phase kind that may be used in practising the invention;

Figure 1:
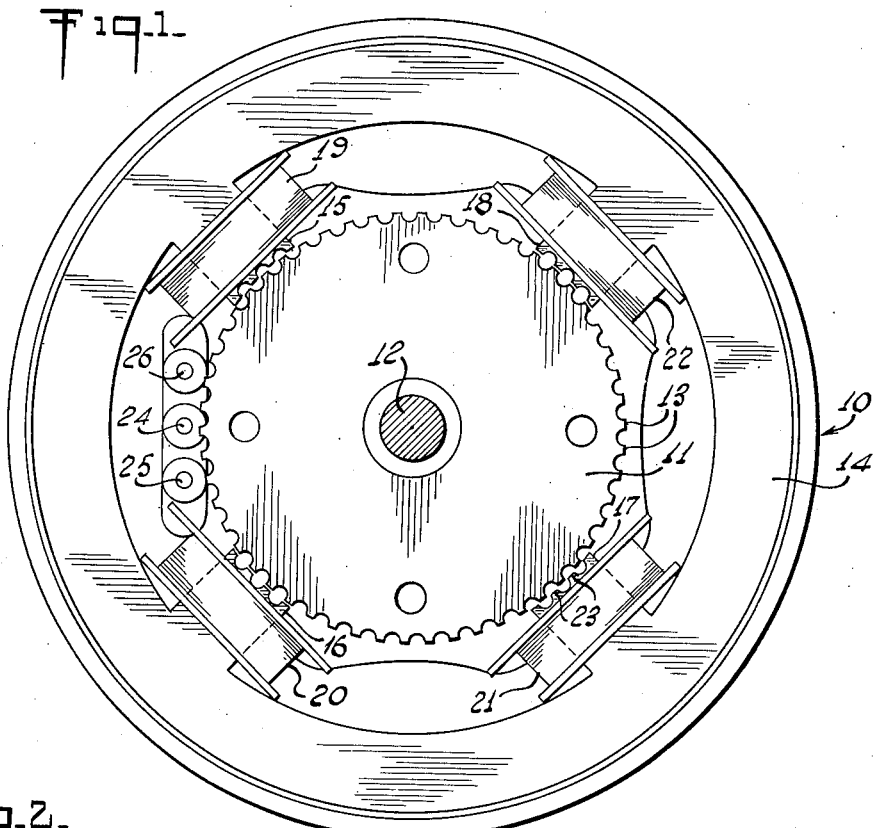

Referring more particularly to FIG. 1, the motor which is therein shown is designated by the numeral 10 and may be of any well known kind, typified by the so-called La Cour phonic-wheel motors. Preferably, although not necessarily, it is of the variable reluctance salient pole kind. The rotor 11 may consist of a cylindrical spider formed of a pile-up of circular iron laminations and affixed to the motor shaft 12. The peripheral face of the rotor is provided with a multiplicity of equally spaced teeth 13 which extend along the length of the rotor, the spacing and number of the teeth being determined by the synchronous speed at which the motor is to run.

Figure 2:
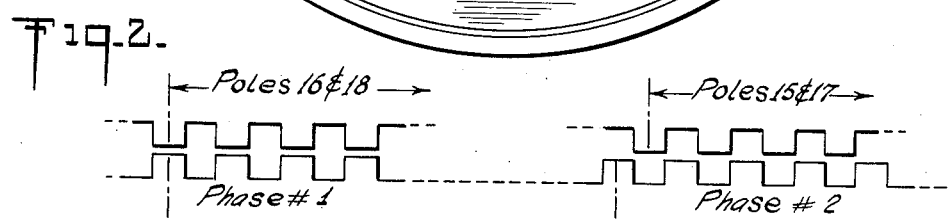
FIG. 2 is a diagram in linear developed form, showing the phase relation between the various teeth on the motor rotor and the motor stator or field poles.

Surrounding the rotor 11 is the cylindrical stator 14 also preferably formed of a pile-up of annular iron laminations and provided with a series of pole pieces 15—18, each of which has wound thereon a respective magnetizing coil 19—22. While the drawing shows a motor with four such pole pieces, it will be understood that a greater or less number, such as one or more, may be employed. Each of the salient poles has on its face adjacent the rotor a series of equally spaced salient pole teeth 23. While the drawing shows each pole provided with a set of four such teeth, a greater or less number may be employed. The number and spacing of said teeth on each pole should be the same. Likewise the peripheral size and spacing between the adjacent teeth on each pole are preferably substantially the same as the peripheral size and spacing of the adjacent teeth on the rotor. However, it will be understood by those familiar with such motors that the width of the peripheral teeth on the salient poles may be less than the peripheral width of the teeth on the rotor and vice versa, provided that when the center line of a pole tooth 23 of pole 18, for example, is in alignment with the center line of a rotor tooth 13, then the center lines of all the pole teeth 23 of pole 16 are in alignment with the center lines of the rotor teeth 13. That is, the teeth on the opposite poles 16 and 18 are always in like phase with respect to the teeth on the rotor 13. On the other hand, teeth on poles 15 and 17 are arranged so that when the above noted in-phase relation occurs between the teeth of poles 16 and 18 and the rotor teeth, the teeth on poles 17 and 19 are 180 degrees out of phase with respect to the rotor teeth. This relation is shown diagrammatically in FIG. 2 of the drawing, wherein it can be seen that when the teeth 23 of poles 16 and 18 are in like phase with the teeth 13 of the rotor, then the teeth 23 of the poles 15 and 17 are 180 degrees out of phase with the teeth 13 of the rotor.

The windings 20 and 22 for poles 16 and 18 can be connected in series or parallel and one end of the series or parallel circuit is connected to one of the motor terminals, namely terminal 24, and the other end of the series or parallel circuit is connected to another motor terminal 25. Likewise the windings 19 and 21 for poles 15 and 17 are connected in series or parallel between motor terminals 24 and 26.

The motor is arranged to be fed with driving pulses from any suitable source of pulsating or alternating current represented by the numeral 27, which for example may be a synchronizing electric signal, for example 600 to 2000 cycles per second, the wave shape of the pulses being either square or sinusoidal. Since the particular motor 10 shown in the drawing, by way of example, is of the two-phase kind, the pulses from source 27 are preferably amplified in a balanced push-pull class "B" amplifier 28 of any well known design whereby there are produced at the output terminals 29, 30, amplified pulses which are 180 degrees out of phase. Although shown as a vacuum tube amplifier, the amplifier 28 may be of the class "B" transistor kind. The terminal 29 is connected to the motor terminal 26 and the terminal 30 is connected to the motor terminal 25. The common return conductor of the amplifier 28 may be grounded, and the positive terminal 35 of the power supply is connected to the motor terminal 24.

Bridged across the windings 19 and 21 is an energy dissipating path comprising for example a resistor 31 in series with a diode rectifier 32. Likewise bridged across the windings 20 and 22 is a similar dissipating path comprising the resistor 33 and the diode rectifier 34. The positive power supply connected to the terminal 35 of the amplifier is therefore applied to the diodes 32 and 34. However, the diodes 32 and 34 are poled in such a direction that each diode is effectively an open circuit for the driving pulses applied to the associated windings from the corresponding amplifier terminals. For example, when a positive phase driving pulse occurs at terminal 29 it flows through the windings 19 and 21 but the diode 32 under this condition is polarized against current conduction so that substantially all the driving pulse energy is applied to the motor windings 19 and 21. Under this condition the terminal 30 is in negative phase and the diode 34 is conductive and acts as a dissipating shunt across the windings 20 and 22 of the second phase of the motor. It has been found that by using such symmetrical dissipating shunt circuits across the two phases of the motor winding, that the magnetic field from each of the phase windings, at the end of each positive phase driving pulse from the amplifier 28, decays at a rate which is consistent with the desired running characteristic of the motor, and provides enhanced operating efficiency. For the same power input, the motor runs cooler and at the same time, the output is substantially increased. This is true of either single-phase or multi-phase motors of the types described.

From the foregoing it will be seen that the diode rectifiers 32 and 34 are, in effect, respective two-position switches which are rendered conductive, or closed, in timed relation to the speed of rotation of the motor shaft and, therefore, in timed relation to the driving impulses applied to the motor windings. It is clear, therefore, that any other similar timed switching arrangement can be used to switch-in the dissipating circuit at the proper instants of time during each fractional revolution of the motor shaft. For example, each diode rectifier could be replaced by a respective circuit opening and closing switch of any well known construction. Such a switch may, for example, be constituted of any well known transistor switch, a plural segment commutator and brush arrangement with the brush or commutator segments driven from the motor shaft. Even a cam operated switch, operated by the rotation of the motor shaft, may be used to make and break the energy dissipation circuit at the appropriate intervals.

Preferably, although not necessarily, each of the resistors 31 and 33 may be adjustable to achieve the optimum in the running and pull-in characteristics. Preferably the resistors 31 and 33 are selected so as to provide a time constant for the dissipation of the magnetic energy across the associated field winding so that it is approximately one-half the period of the frequency of the source 27, although the optimum may depend upon the ratio of the tooth face width to tooth space width and other physical factors. It will be understood that, if necessary, each of the resistors can be shunted by a capacitor, or by an inductor, or by a combination thereof to provide a special time constant for the energy dissipation path. In any event the resistance of resistors 31 and 33 should not be too high since otherwise they would have practically no effect in the desired dissipation of the magnetic energy at the end of each positive driving impulse at the terminals 29 and 30; and on the other hand, if the resistors 31 and 33 are too low in value they will leave too much energy stored in the magnetic field at the end of each driving pulse and will cause retarding torque or the equivalent of a magnetic braking action on the motor. In a particular arrangement which was found to provide the desired results, the source 27 had a frequency of 900 cycles per second, the motor 10 was of the two-phase reluctance salient pole kind as shown in FIG. 1, and the resistors 31 and 33 had a resistance of approximately 300 ohms each depending upon the impedance of the magnetizing windings.

Figures 3, 4:
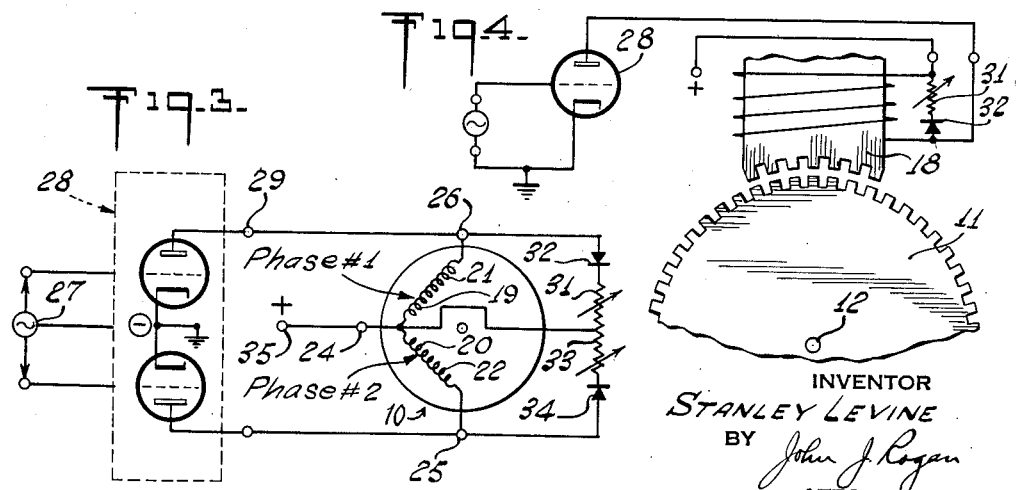
FIG. 3 is a schematic electrical wiring diagram of a synchronous motor system according to the invention.
FIG. 4 is a schematic illustration of the invention in connection with a single phase motor.

It will be understood that while the invention is illustrated in connection with a synchronous motor having four main stator pole pieces and respective windings, it is equally applicable to a motor having a single main pole piece or a pair of opposed such pole pieces and respective magnetizing winding or windings. In that case a single amplifier tube and a single diode rectifier are used as shown schematically in FIG. 4.

While in the foregoing the dissipation circuit has been shown as applied to motors of the single phase and two-phase kind, it will be understood that the dissipation feature above described can be equally used in connection with a synchronous motor of three or more phases and to various designs of motors of the phonic-wheel kind or variable reluctance impulse.

While the invention is capable of wide application for driving synchronous equipment, it is particularly well suited to the driving of precision equipment such as facsimile machines which must run at a precise rate determined by the frequency of the synchronizing signals represented in the drawing by the source 27.

Various changes and modifications may be made in the disclosed embodiment without departing from the spirit and scope of the invention.

What is claimed is:

1. A synchronous motor system, comprising in combination, a synchronous motor of the timed impulse driven kind having stator windings and a rotor and designed to run continuously at a predetermined synchronous speed, a source of electric driving pulses of a given frequency for energizing said windings and for thereby continuously driving the rotor in synchronism with said pulses by magnetic energy between the windings and rotor, and an electric intermittently conductive dissipating path connected to said windings to cause said magnetic energy at the end of each driving pulse to decay at a predetermined rate correlated with the incremental synchronous rotation of the said rotor.

2. A synchronous motor system, comprising in combination, a source of motor driving pulses, a synchronous motor of the timed impulse driven kind having a plurality of stator pole elements, energizing windings for said stator pole elements, a plurality of rotor elements, the number of pole elements and rotor elements being correlated with the frequency of said pulses to drive the motor continuously at synchronous speed, and an energy dissipation path connected to said windings to correlate the rate of decay of the magnetic field between each stator pole element and each rotor pole element with the termination of each driving pulse.

3. A synchronous motor system, comprising in combination, a synchronous motor of the salient pole variable reluctance kind with magnetized windings for the salient poles and arranged to be excited by draving pulses of predetermined frequency, and means to increase the efficiency of the motor at synchronous speed, said means including an energy dissipation path connected to said windings and means to control said dissipation in correlation with each of the said driving pulses.

4. A synchronous motor system according to claim 3 in which said dissipation path includes resistance means and diode rectifier means connected in shunt to a motor winding.

5. A synchronous motor system according to claim 3 in which said dissipation path includes a device for passing currents only during periods when a winding is being energized by driving pulses of a predetermined phase.

6. A synchronous motor system according to claim 5 in which said device is an intermittently operating switch which is closed in timed relation with the motor rotation.

7. A synchronous motor system according to claim 5 in which said device is an asymmetric conductive switch having an associated timing circuit correlated with the motor rotation.

8. A synchronous motor system, comprising in combination, a synchronous motor arranged to be continuously driven by pulses of a predetermined frequency and having at least one stator pole piece with a series of salient teeth, a rotor having a multiplicity of rotor teeth, a magnetizing winding for said pole piece, means to energize said winding with driving pulses, and energy dissipation means connected to said winding and having intermittent switching means which is non-conductive during the application of driving pulses to the winding, and which becomes conductive only at the termination of each such driving pulse.

9. A synchronous motor system, comprising in combination, a synchronous motor of the salient pole reluctance kind having a plurality of poles with salient teeth and a corresponding toothed rotor and arranged to be continuously driven by pulses of a predetermined frequency, magnetizing windings for said poles, said poles being arranged in pairs with the salient teeth of one pair being arranged so that when they are in phase with the corresponding rotor teeth the salient teeth of another pair of poles are out of phase with respective rotor teeth, means to energize the windings of the pole pairs in 180 degrees phase displacement, electric energy dissipation means connected across each pair of windings, and means to render said dissipation means effective in timed correlation with the termination of each driving pulse.

10. A synchronous motor system according to claim 9 in which a source of single phase driving pulses is provided for the motor, and a push-pull amplifier is connected between said source and said windings to energize said pairs of windings in said 180 degrees phase displacement.

11. A synchronous motor system according to claim 10 in which each pair of windings has connected in shunt thereto an energy dissipation path including an asymmetric device which is conductive only when the associated pair of windings is being energized by a driving pulse of a predetermined phase.

12. A synchronous motor system according to claim 11 in which each energy dissipation path includes a resistor and a diode network with the resistor proportioned to impart a time constant to the decay in the magnetic field at each pole which decay rate is approximately one-half the period of the frequency of said driving pulses.

References Cited in the file of this patent
UNITED STATES PATENTS

| | | |
|---|---|---|
| 2,545,989 | Burgwin | Mar. 20, 1951 |
| 2,868,550 | Carney | Oct. 1, 1957 |